Figure 1:
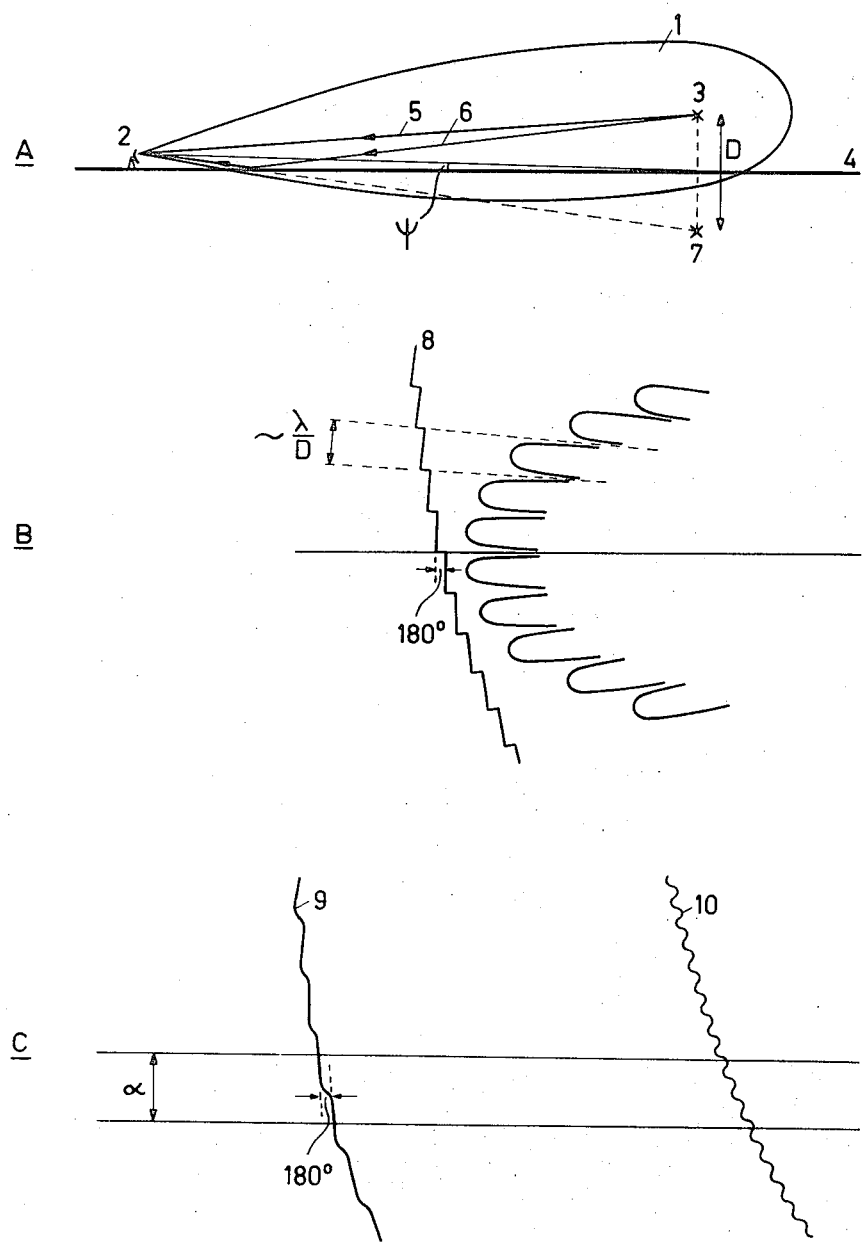

United States Patent [19]

van Staaden et al.

[11] 3,827,049
[45] July 30, 1974

[54] RADAR SYSTEM FOR TRACKING TARGETS FLYING AT LOW ALTITUDE

[75] Inventors: Cornelis Augustinus van Staaden; Maximiliaan Hubert Bodmer; Herman Michel van Hijfte; Bernard Gellekink, all of Hengelo, Netherlands

[73] Assignee: N. V. Hollandse Signaalapparaten, Hengelo, Netherlands

[22] Filed: Dec. 21, 1972

[21] Appl. No.: 317,217

[30] Foreign Application Priority Data
Dec. 23, 1971 Switzerland............ 018862/71

[52] U.S. Cl............. 343/7.3, 343/7.4, 343/16 M, 343/876
[51] Int. Cl............. G01s 9/16, G01s 9/22
[58] Field of Search........... 343/7.4, 7.3, 16 M, 876

[56] References Cited
UNITED STATES PATENTS

| | | | |
|---|---|---|---|
| 2,891,244 | 6/1959 | Pastoriza............ | 343/7.3 |
| 2,907,030 | 9/1959 | Thourel............ | 343/876 X |
| 3,014,214 | 12/1961 | Ashby et al............ | 343/16 M |
| 3,126,542 | 3/1964 | Knutson et al............ | 343/16 M |
| 3,218,640 | 11/1965 | Kindle et al............ | 343/7.4 X |
| 3,307,183 | 2/1967 | Adam............ | 343/7.4 X |
| 3,453,617 | 7/1969 | Begeman et al............ | 343/7.4 |
| 3,618,091 | 11/1971 | Butler............ | 343/16 M |
| 3,623,094 | 11/1971 | Grabowski............ | 343/7.4 |

*Primary Examiner*—Malcolm F. Hubler
*Attorney, Agent, or Firm*—Frank R. Trifari

[57] ABSTRACT

A radar system is provided with a first radar apparatus for the range and angle tracking of targets located at a relatively long range and with a second radar apparatus for at least the angle tracking of targets at a relatively short range. The radar apparatus both operate at an own wavelength, but they employ one and the same tracking antenna. The wavelength of the second radar apparatus is so selected that, in case a target being tracked at a relatively low altitude is within the range of said second radar apparatus, the interference caused by the receipt of target echoes reflected by the earth surface does not influence the antenna tracking movement. When a target being tracked is outside the range of the second radar apparatus, it is tracked by the first radar apparatus in range and in angle coordinates. When said target arrives within the range of the second radar apparatus, it can be tracked in angle coordinates by the latter radar apparatus and in range by the former radar apparatus.

4 Claims, 4 Drawing Figures

RADAR SYSTEM FOR TRACKING TARGETS FLYING AT LOW ALTITUDE

The invention relates to a radar system for the automatic tracking of targets, in particular of targets which are at a relatively low altitude, such as low approaching aircraft. When tracking such targets flying at a relatively low altitude, the radar beams will strike also a part of the earth surface, through which the tracking antenna of the radar system receives, in addition to the echoes derived directly from the target being tracked, also echoes derived from said target and reflected by the earth surface. The subsequent disturbance of the reflection radiation pattern may impede the accurate tracking of these targets. It is hence an objection of the present invention to provide a radar system, with which the accurate tracking of targets is retained, even if reflections against the earth surface cause an extensive disturbance of the reflection radiation pattern.

In accordance with the invention, the radar system is provided with a first radar tracking apparatus for the range and angle tracking of targets located at a relatively long range and a second radar tracking apparatus for at least the angle tracking of targets at a relatively short range, which radar apparatus, each operating at an own wavelength, employ one and the same tracking antenna, where the wavelength of the second radar apparatus is so selected that, in case a target being tracked at a relatively low altitude is within the range of said second radar apparatus, the interference caused by the receipt of target echoes reflected by the earth surface does not influence the antenna tracking movement, whereby in a first mode, in which a target being tracked is outside the range of the second radar apparatus, said target is tracked by the first radar apparatus in range and in angle coordinates, whereto it is provided with a range gate circuit, a range tracking unit controlling said range gate circuit, and an angle tracking unit, which supplies the error voltages for the alignment of the antenna, and in a second mode, occurring when the target being tracked by the first radar apparatus arrives within the range of the second radar apparatus, said target can be tracked in angle coordinates by the second radar apparatus and in range by the first radar apparatus, whereto the second radar apparatus is also provided with an angle tracking unit, that supplies the error voltages for the alignment of the antenna, and a range gate circuit which can, however, be controlled by the range tracking unit of the first radar apparatus, which radar apparatus further comprises switching means with the aid of which the error voltages supplied by the angle tracking unit of either the first or the second radar apparatus are fed to servos required for the angle tracking movement, which switching means are controlled by at least a control signal derived from the second radar apparatus, indicating that the target being tracked is within its range.

Figure 2:
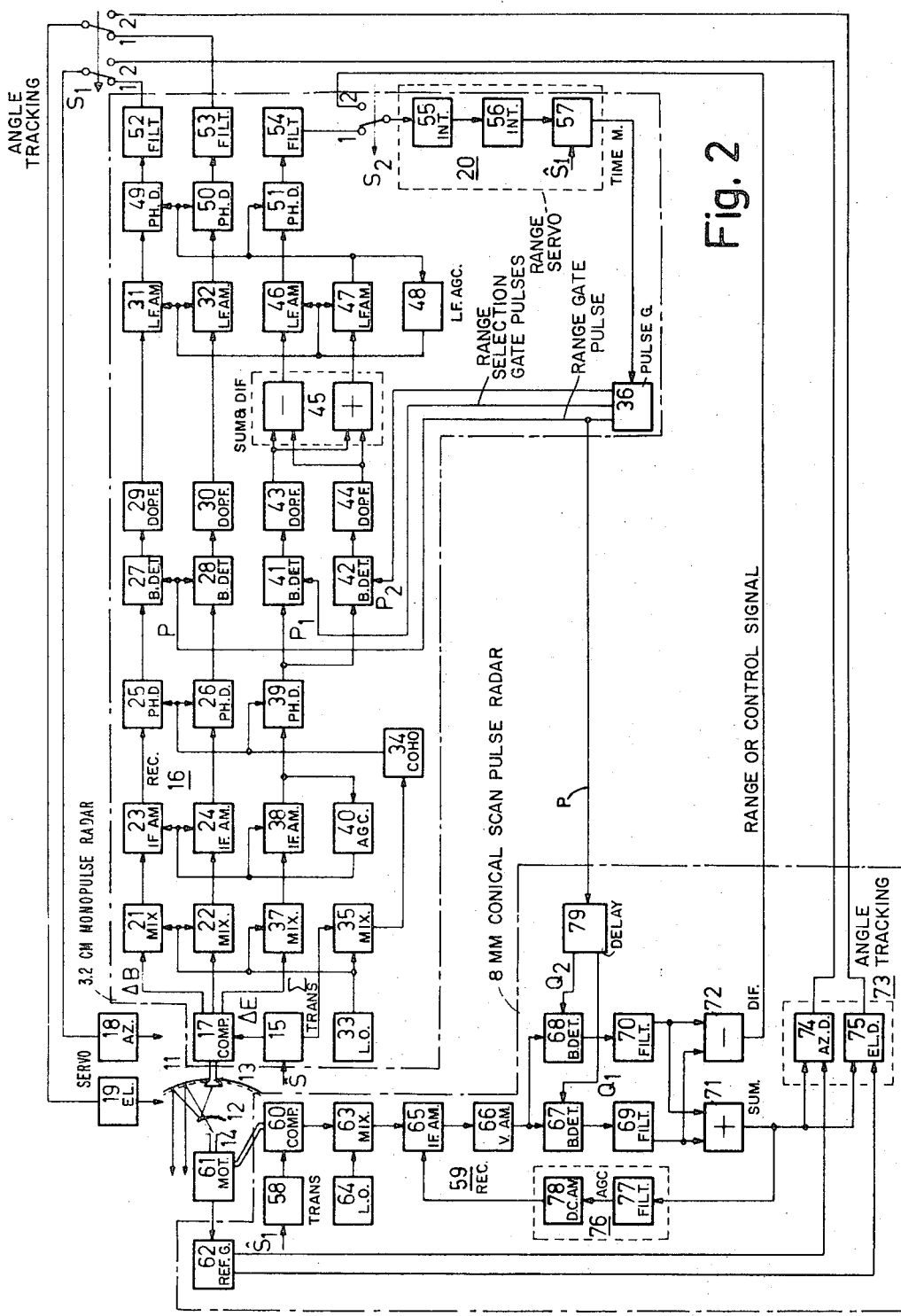

The invention and its advantages will further be described with reference to the figures, of which:

FIG. 1 illustrates a number of diagrams in explanation of the problem for which the radar system, in accordance with the invention, will provide a solution while FIG. 2 illustrates a block diagram of an embodiment of such a radar system.

FIG. 1A shows schematically the radar beam 1 of a radar tracking antenna 2. The beam 1 directed to the target 3 being tracked strikes also a part of the earth surface 4, so that the tracking antenna 2 receives, in addition to echoes derived direct from the target 3 via the path 5, also target echoes reflected by the earth surface 4 via the path 6. The echoes received via the path 6 seem to originate from a fictitious target 7 which is, with respect to the reflecting earth surface, the image of the target 3 being tracked. In a mathematical model, target and image, with respect to the antenna, may be represented by two radiators mutually in phase opposition and situated at a distance D from each other, where the emitted radiation has an amplitude ratio of k, corresponding with the reflection coefficient of the reflecting earth surface. At the antenna the waves emitted by the two radiators show a mutual phase difference $\phi = 2\pi D \sin \psi / \lambda$ corresponding with the path length difference between the two radiators and the antenna, and taking into account the additional phase jump $\pi$ introduced by the reflection against the earth surface. In this expression $\lambda$ represents the wavelength, D and $\psi$ the quantities indicated in FIG. 1A. Suppose that the amplitude ratio $k = 1$, then the centre of the radiation pattern produced by the two radiators, is midway between the two radiators. For this extreme situation the radiation pattern is shown in FIG. 1B, indicating a succession of minima and maxima; so the minima occur at a phase difference of $\phi = \pi \pm 2\pi n$ ($n$ is a whole number). Furthermore, a phase jump $\pi$ occurs with these minima, so that the wavefront, as encountered by the antenna, assumes the shape of the curve 8 illustrated in FIG. 1B. In view of the fact that in practice the value $k$ is much smaller than 1, the radiation pattern deviates from that described above to such an effect that the centre of the radiation pattern is no longer midway between the two radiators, but tends to the stronger radiator (here the target 3 being tracked), and that the phase jumps occurring with the minima are less abrupt than shown in FIG. 1B. The wavefront generated by the two radiators may then be represented by the curve 9 shown in FIG. 1C. The phase jumps in the wave front occur, independent of the factor $k$, at an elevation difference which is proportional to the used wavelength $\lambda$ and inversely proportional to the altitude $½D$ at which the target being tracked is situated. The wave front encountered by the antenna (of which the aperture is indicated by $\alpha$ in FIG. 1C) will in general seem to come from a direction different to that of the target being tracked, if for example, as indicated by the curve 9 in FIG. 1C, a phase jump is observed within the aperture $\alpha$. The tracking antenna will then no longer be directed to the target being tracked, but will align itself at an elevation that is either too small or too large. The angular error thus arising is, however, inversely proportional to the range of the target being tracked, provided the target has not approached the antenna too closely, since for very short ranges the elevation of the radar beam increases as the target approaches the antenna; thus reducing the image effect and hence the angular error. In fact, within a certain range no image effect will occur at all. When a radar tracking apparatus operating at a wavelength of $\lambda = 3.2$ cm is used, it is found that the accurate tracking of a low-flying target, that is, in angle coordinates, is impossible if this target is at a range of about 5 km from the antenna. If the used wavelength is decreased by a factor 4, i.e., $\lambda = 8$ mm, the phase jumps in the wave front will occur with an elevation difference reduced by a factor 4; the wave front then obtained is shown by the curve 10 in FIG. 1C. The number of phase jumps falling within the antenna aperture α will then be such that the antenna observes a wavefront that seems to originate from the neighborhood of the target being tracked, since the antenna observes only the average effect of the phase jumps over the aperture α. The angular error, caused by the image effect through the earth surface, is thus considerably reduced by selecting a smaller wavelength. However, the range of a radar tracking apparatus, operating at a wavelength of 8 mm, is very limited and the application of such a tracking apparatus has little use. In order to realise a radar tracking system which enables the tracking of targets at a relatively long range and also the accurate tracking of targets at low altitude and at relatively short range, such a radar system, in accordance with the invention, should comprise a first radar tracking apparatus for the range and angle tracking of targets at a relatively long range, and also a second radar tracking apparatus at least for the angle tracking of targets at a relatively short range, which radar apparatus, each operating at an own wavelength, in this case 3.2 cm and 8 mm respectively, employ one and the same tracking antenna. Here, the wavelength of the second radar apparatus is so selected that, in case a target being tracked at a relatively low altitude is within the range of said second radar apparatus, the interference caused by the receipt of target echoes reflected by the earth surface do not influence the antenna tracking movement. In a first mode, in which a target being tracked is outside the range of the second radar apparatus, said target is tracked in range and angle coordinates by the first radar apparatus. The latter radar apparatus is thereto provided with a range gate circuit, a range tracking unit controlling said range gate circuit, and an angle tracking unit that supplies the error voltages for the alignment of the antenna. In a second mode, occurring when the target being tracked by the first radar apparatus arrives within the range of the second radar apparatus, said target can be tracked in angle coordinates by the second radar apparatus and in range by the first radar apparatus. The second radar apparatus is thereto also provided with an angle tracking unit, that supplies the error voltages for the alignment of the antenna, and a range gate circuit which can, however, be controlled by the range tracking unit of the first radar apparatus. The radar system further comprises switching means with the aid of which the error voltages supplied by the angle tracking unit of either the first or the second radar apparatus, are fed to servos required for the angle tracking movement. The switching means are controlled by at least a control signal derived from the second radar apparatus, indicating that the target being tracked is within its range.

If the target being tracked by the 3.2-cm radar apparatus arrives within the range of the 8-mm radar tracking apparatus and the system thus changes into the second mode, the target can be tracked in angle coordinates by the 8 mm apparatus and in range by the 3.2-cm radar apparatus. The latter is, however, not necessary; the range tracking may also be performed by the 8-mm radar apparatus.

The invention will now be described on the basis of a special embodiment of the radar system. In this embodiment, shown in a block diagram in FIG. 2, the 3.2-cm radar apparatus is formed by a monopulse radar apparatus and the 8-mm radar apparatus by a conical scan pulse radar apparatus. The selection of the two radar apparatus is, however, not limited to this; any combination of existing pulse radar tracking apparatus may be applied for the realisation of the invention. In selecting these radar apparatus due account must be paid to the fact that the two radar tracking apparatus make use of one and the same tracking antenna.

In the embodiment shown in FIG. 2 the radar system uses a polarisation-rotating Cassegrain antenna, of which the main reflector 11 is a parabolic twist reflector and the subreflector 12 a hyperbolic horizontal grid (transreflector). The feedhorn 13 of the 3.2-cm monopulse radar apparatus is situated at the zenith of the parabolic reflector 11, also forming a first focus of the subreflector. The radiation emitted by the feedhorn 13 illuminates, after reflection by the subreflector 12, the twist reflector 11 which rotates the polarisation plane of this radiation through 90°; this is to prevent that the subreflector 12 influences the raditation pattern adversely. The radiator 14 of the 8-mm radar apparatus is situated at the focus of the twist reflector 11. The vertically polarised radiation emitted by this radiator passes the subreflector 12 undisturbed and, due to the fact that its wavelength is precisely four times as small as that of the monopulse radar apparatus, is not subjected to polarisation shift. If the 8-mm radar apparatus were also designed as a monopulse radar apparatus, the feedhorn of said radar apparatus could, in addition of being placed at said focus of the twist reflector, also be integrated with the feedhorn of the 3.2 cm-monopulse radar apparatus, the latter feedhorn being placed at the zenith of the twist reflector.

The 3.2-cm monopulse radar apparatus is of the type based on the sum-and-difference method with which type a moving target can be tracked in range, in spite of the simultaneous receipt of relatively strong clutter signals. The radar apparatus comprises a transmitter 15 and a receiver 16. The electromagnetic energy generated in the transmitter is transmitted, via the above-mentioned Cassegrain antenna, in the pulse rhythm of the synchronisation pulses S delivered by the synchronisation pulse generator not shown in the figure. As is customary with a monopulse radar apparatus based on the sum-and-difference method, the energy resulting from a target echo and received in the four sections of the feedhorn 13 is converted into an elevation difference signal $\Delta E$, an azimuth difference signal $\Delta B$ and a sum signal $\Sigma$ with the aid of a comparator 17. The above-mentioned signals contain amplitude and phase information which is a measure for the magnitude and direction of the target deviation with respect to the radar symmetry axis. These signals can thus be used for the generation of the error signals required for the control of an azimuth servo 18, an elevation servo 19 and a range servo 20, respectively, with the aid of which servos the target is tracked in azimuth, elevation and range. The above-mentioned signals $\Delta B$, $\Delta E$ and $\Sigma$ are thereto fed to the receiver 16, in which they are processed in separate channels. The two receiver channels, one processing the $\Delta B$ signal and the other the $\Delta E$ signal, comprise respectively mixers 21 and 22, intermediate-frequency amplifiers 23 and 24, phase-sensitive detectors 25 and 26, boxcar detectors 27 and 28, doppler filters 29 and 30, and low-frequency amplifiers 31 and 32. Since said receiver channels are mutually identical, the operation of the receiver channel processing the $\Delta B$ signal will be described only. In the mixer 21 the high-frequency ΔB signal is converted into an intermediate-frequency signal through a local oscillator 33. After amplification in the intermediate-frequency amplifier 23 the intermediate-frequency signal $\Delta B_{IF}$ is mixed with the output signal of a coherent oscillator (coho) 34. As the transmitter 15 consists of an oscillator (magnetron) that is operating only for the duration of the pulse, this implies that the phase of the signal derived from this transmitter is distributed practically at random with respect to the output signal of local oscillator 33. To meet the consequences, these two signals are fed to a mixer 35. The output signal of this mixer is fed to an oscillator 34 such that this oscillator is forced to assume the same phase. The signal delivered by the coho 34 is then a replica of the transmitter frequency, transformed, however, to the intermediate frequency. In this way it is achieved that the echo of an ideal fixed target at intermediate-frequency level has invariably the same relationship with respect to the coho signal, so that after mixing in the phase-sensitive detector 25 a pulse with constant amplitude is obtained. For a moving target said phase-relationship and hence the amplitude varies as the doppler frequency shift.

The circuit following the phase-sensitive detector 25, the "boxcar," has two functions. Firstly, a range selection occurs here, that is, only the echo pulses which fall within a range gate P determined by a gate pulse generator 36 are passed through. Secondly, the pulses are stretched in such a way that the output signal of the boxcar is formed by the envelope signal of the selected pulses. This envelope signal is fed, via the doppler filter 29, to l.f. amplifier 31, which delivers an output signal whose amplitude is a measure for the angular error in azimuth.

The receiver channel processing the sum signal Σ comprises a mixer 37, an intermediate-frequency amplifier 38 and a phase-sensitive detector 39, with the aid of which the ΔB signal processes the high-frequency sum signal in the same way as described above, so that, also in this case, after coherent detection a pulse with constant amplitude is obtained for echoes of fixed targets, while this amplitude for echoes of a moving target varies as the doppler frequency shift.

In order to eliminate the fluctuations due to changes of the target range and/or the total reflecting target surface, the intermediate-frequency difference signals are standardised with respect to the intermediate-frequency sum signal by means of an AGC circuit 40, connected to the output of the intermediate-frequency amplifier 38.

The receiver sum channel differs from the difference channel in that respect that the output signal of the phase-sensitive detector 39 is fed to two boxcars 41 and 42, which are each supplied with a different range selection gate pulses $P_1$ and $P_2$ respectively, where the trailing edge of range selection gate pulse $P_1$ coincides with the leading edge of range selection gate pulse $P_2$. The extent of the two range selection gates corresponds with the range gate pulse P supplied to boxcar detectors 27 and 28. If the aligned leading and trailing edges of said range selection gates coincide with the axis of symmetry of the sum video, the two boxcars 41 and 42 deliver an equal output signal. In the other case a difference arises. Each of the output signals of the two boxcars 41 and 42 are now fed to a sum-and-difference circuit 45 of which the difference output and the sum output are each connected to a low-frequency amplifier 46 and 47 respectively. The amplitude of the output signal of low-frequency amplifier 46 is a measure for the range error.

Each of the output signals of the low-frequency amplifiers 31, 32 and 46 respectively forms a first output signal of the receiver, while the sum signal at the output of low-frequency amplifier 47 forms a second output signal of the receiver. In spite of the fact that at i.f. level an automatic gain control is applied on the basis of the absolute value of the Σ signal at the input of detector 39, the low-frequency Σ signal is not constant; for an attenuation occurs if the echo of the target being tracked coincides with the relatively strong echo of a fixed target, since the i.f. AGC keeps the sum constant. In order to obviate this, the amplification in the l.f. amplifier stages is determined by an AGC circuit 48 (l.f. AGC) which keeps the output signal of the Σ amplifier 47 constant on the basis of the average value. At the same time the other l.f. amplifiers 31, 32 and 46 are adjusted passively.

Since the two first output signals of the receiver consist of an a.c. voltage, these signals, indicating the angular errors and range errors, are compared with the second output signal of the receiver in phase-sensitive detectors 49, 50 and 51 respectively, in order to determine the sign of said errors. The output signals of the detectors 49 and 50 are then fed, via the filters 52 and 53, to the servos 18 and 19, respectively, for the alignment of the antenna in azimuth and elevation. The output signal of the detector 51 is supplied, via a filter 54, to the range servo 20. This servo consists of the cascade connection of two integrators 55 and 56, and the time modulator 57. The latter is started by each synchronisation pulse S, whereupon it delivers an output pulse after a period that varies as the output voltage of integrator 56. This output pulse is supplied to the gate pulse generator 36 for the determination of the moment of appearance of the range gate and range selection gates produced by this generator.

The 8-mm radar apparatus is of the type employing the conical scan tracking method. This radar apparatus comprises a transmitter 58 and a receiver 59. The aforementioned Cassegrain antenna emits the electromagnetic energy generated in the transmitter in the pulse rythm of the synchronisation pulses $\hat{S}_1$ delivered by the aforementioned synchronisation pulse generator not shown in the figure. The synchronisation pulses $\hat{S}_1$ have been given a certain delay with respect to the synchronisation pulses Ŝ supplied to the transmitter 15 of the monopulse radar apparatus.

The nutation movement inherent to a conical scan radar apparatus, is obtained by a scan motor 61. This motor provides for the rotational movement of the radiator 14 directed from the center and also for driving a reference generator 62. The reference generator delivers two reference voltages which differ mutually 90° in phase and which are required for the extraction of the angle tracking errors from the detected echo signals. It should be noted that the polarisation plane is retained during the nutation movement.

The receiver 59 comprises, as usual, a mixer 63 in which the high frequency echo signal is converted into an intermediate-frequency signal with the aid of a local oscillator 64, an intermediate-frequency amplifier 65 and a linear detector video amplifier 66. the video signals obtained by detection of the intermediate-frequency signals are modulated with the rotation frequency of the 8-mm radar beam around the antenna axis.

The video signals obtained are fed to two boxcar detectors 67 and 68. Each of these boxcar detectors are supplied with a difference range selection gate $Q_1$ and $Q_2$, where the trailing edge of the range selection gate $Q_1$ coincides with the leading edge of the range selection gate $Q_2$. If the aligned and trailing edges of said range selection gates coincide with the axis of symmetry of the sum video, the two boxcar detectors 67 and 68 deliver an equal output signal. in the other cases a difference arises. Each of the output signals of the two boxcars detectors then fed, via a filter 69 and 70 respectively, to a summing amplifier 71 and a differential amplifier 72. THe outut signal of the summing amplifier 71 is produced by a d.c. voltage modulated with the afore-mentioned rotation frequency; this signal containing the desired angle information is fed to the angle tracking unit 73. This unit consists of an azimuth angle detector and an elevation angle detector 74 and 75 respectively. Each of these detectors is supplied with one of the reference voltages originating from the generator 62. The output signals of the detectors 74 and 75 may be fed to the servos 18 and 19 for the alignment of the antenna in azimuth and elevation respectively.

The output signal of the difference amplifier is a measure for the range error. The use of this signal for the tracking of targets in range, while the 8 mm radar apparatus does not contain an own range tracking unit, will be described hereinafter.

The receiver 59 also contains an AGC circuit 76 to keep the d.c. voltage at the output of the intermediate frequency amplifier 65 constant; this circuit contains an AGC filter 77 passing only the frequency components below the conical scan, and a d.c. amplifier 78.

The radar system contains a switch $S_1$ with the aid of which either the angle error voltage of the detectors 74 and 75 or those of the detectors 49 and 50 can be fed to the servos 18 and 19, respectively, via the filters 52 and 53. Furthermore, a switch $S_2$ is provided; with this switch the range servo 20 of the monopulse tracking apparatus can be connected to the conical scan radar apparatus.

If the system is in the first mode, i.e., the target being tracked is outside the range of the 8-mm conical scan radar apparatus, the target is tracked in azimuth, elevation and range by the 3.2-cm monopulse radar apparatus. The switches $S_1$ and $S_2$ are then both in the position 1, as indicated in FIG. 2. As soon as a target is within the range of the 8-mm conical scan radar apparatus, this apparatus has to take over the angular tracking movement; however, this is possible only if range selection gates $Q_1$ and $Q_2$ have already been aligned with the target. This is achieved because the gate pulse generator 36 of the 3.2-cm monopulse radar apparatus also determines the tracking gates for the 8-mm conical scan radar apparatus, provided however that the range selection gates $Q_1$ and $Q_2$ are given a delay with respect to he gates $P_1$ and $P_2$ of the monopulse radar apparatus, which delay corresponds with the delay between the synchronisation pulses $S$ and $S_1$. This delay is realised by the delay circuit 79 connected to the gate pulse generator 36. In this way the range gate of the 8-mm conical scan radar apparatus continuously follows the range gate of the 3.2-cm monopulse radar apparatus, and the radar system can simply be switched to the second mode if the target has come within the range of the 8-mm conical scan radar apparatus. Since in this process the angle tracking movement is effected by the 8-mm conical scan apparatus, the switch $S_1$ is to be set to the position 2. If it is then desired that also the range tracking be performed by the 8-mm conical scan radar apparatus, the switch $S_2$ is to be set to position 2, and the output signal of the difference amplifier 72, which signal is a measure for the range error, is fed to the range servo 20. This servo controls the gate pulse generator 36, which feeds the aligned range selection gates $Q_1$ and $Q_2$ to the boxcar detectors 67 and 68, respectively, via the delay circuit 79. Also in this situation the delay circuit is essential, since the time modulator 57 of the range servo 20 responds, also in this case, to the synchronisation pulses S of the monopulse radar apparatus, while the range tracking is being performed by the conical scan radar apparatus.

What we claim is:

1. A radar system comprising a tracking antenna operable at two different wavelengths; antenna positioning means for controlling the movement of said antenna; first radar means connected to said antenna to transmit and receive radar signals at a longer wavelength suitable for tracking over a relatively long range, said first radar means including a first angle tracking circuit to produce angle error signals over the range of said first radar means, and a range tracking circuit having a gate circuit to produce gating pulses for said first angle tracking circuit; second radar means connected to said antenna to transmit and receive radar signals at a wavelength which is substantially smaller than aperture of said antenna and than the wavelength of said first radar means, said second radar means including a second angle tracking circuit controlled by said gate circuit, and means for deriving a control signal indicating that the target is within the range of said second radar means; and switching means for connecting said first angle tracking circuit and, respectively, said second angle tracking circuit to said antenna positioning means.

2. A radar system as claimed in claim 1 further including additional switching means for applying said control signal to said range tracking circuit when said second angle tracking circuit is connected to said antenna positioning means.

3. Radar system as claimed in claim 1, wherein the first radar means is formed by a monopulse radar apparatus operating at a wavelength of 3.2 cm and the second radar means by a conical scan pulse radar apparatus operating at a wavelength of 8 mm, whereby the common tracking antenna includes a Cassegrain antenna of which the main reflector is a twist reflector and the subreflector a transreflector, and the radiator of the monopulse radar apparatus is situated at the zenith of the main reflector and the radiator of the conical scan radar at the focus of said latter reflector.

4. A radar system as claimed in claim 3, wherein a time difference is introduced between the transmitted pulses of said first and second radar means, said second radar including a delay circuit between said gate circuit and said second angle tracking circuit for delaying the gate pulses about said time difference.

* * * * *